US011486021B2

(12) United States Patent
Spencer et al.

(10) Patent No.: US 11,486,021 B2
(45) Date of Patent: Nov. 1, 2022

(54) METHOD OF PEENING AN OBSTRUCTED REGION OF A METAL ASSEMBLY

(71) Applicant: Framatome Inc., Lynchburg, VA (US)

(72) Inventors: Andrew J. Spencer, Fredericksburg, VA (US); Douglas M. Lawrence, Evington, VA (US); Gary R. Poling, Forest, VA (US); Ryan S. Melcher, Goode, VA (US)

(73) Assignee: Framatome Inc., Lynchburg, VA (US)

( * ) Notice: Subject to any disclaimer, the term of this patent is extended or adjusted under 35 U.S.C. 154(b) by 49 days.

(21) Appl. No.: 16/337,525

(22) PCT Filed: Oct. 3, 2016

(86) PCT No.: PCT/US2016/055138
§ 371 (c)(1),
(2) Date: Mar. 28, 2019

(87) PCT Pub. No.: WO2018/067106
PCT Pub. Date: Apr. 12, 2018

(65) Prior Publication Data
US 2019/0226049 A1 Jul. 25, 2019

(51) Int. Cl.
*C21D 10/00* (2006.01)
*C21D 7/06* (2006.01)
(Continued)

(52) U.S. Cl.
CPC ............ *C21D 10/005* (2013.01); *C21D 7/06* (2013.01); *C21D 9/50* (2013.01); *G21C 13/036* (2013.01);
(Continued)

(58) Field of Classification Search
None
See application file for complete search history.

(56) References Cited

U.S. PATENT DOCUMENTS 5,307,661 A * 5/1994 Fink ........................ B24C 3/325
376/249
5,443,201 A 8/1995 Cartry
(Continued)

FOREIGN PATENT DOCUMENTS

EP 0 622 156 A1 11/1994
JP 2006346775 A * 12/2006
JP 4831807 12/2011

OTHER PUBLICATIONS

Jain et al., "Modeling of material removal in mechanical type advanced machining process : a state-of-the-art review", International Journal of Machine Tools & Manufacture (Year: 2001).*
International Search Report and Written Opinion for PCT/US16/55138.

*Primary Examiner* — Adam J Eiseman
*Assistant Examiner* — P Derek Pressley
(74) *Attorney, Agent, or Firm* — Davidson, Davidson & Kappel, LLC (57) ABSTRACT

A method for peening an obstructed region of a metal assembly that is obstructed by an obstructing part of the metal assembly is provided. The method includes determining an optimal peening path for treating the obstructed region irrespective of the obstructing part; identifying a portion of the obstructing part within the optimal peening path; determining a section of the portion of the obstructing part that is removable without affecting a mechanical integrity and functionality of the obstructing part; removing, by machining, the section so as to create additional space along the optimal peening path; and peening the obstructed region, a path of the peening at least partially crossing through the additional space. A method for peening a nuclear reactor pressure vessel is also provided.

19 Claims, 6 Drawing Sheets

(51) Int. Cl.

| | |
|---|---|
| *C21D 9/50* | (2006.01) |
| *G21C 13/036* | (2006.01) |
| *G21C 17/00* | (2006.01) |
| *G21C 19/20* | (2006.01) |
| *G21C 21/00* | (2006.01) |
| *G21C 19/00* | (2006.01) |
| *G21C 21/02* | (2006.01) |

(52) U.S. Cl.
CPC .............. *G21C 17/00* (2013.01); *G21C 19/00* (2013.01); *G21C 19/207* (2013.01); *G21C 21/00* (2013.01); *G21C 21/02* (2013.01); *Y02E 30/30* (2013.01)

(56) References Cited

U.S. PATENT DOCUMENTS

| | | |
|---|---|---|
| 6,341,151 B1 | 1/2002 | Enomoto et al. |
| 2003/0029845 A1* | 2/2003 | Tamura .............. B23K 35/0227 219/121.64 |
| 2004/0245323 A1* | 12/2004 | Offer .................... B23K 9/0061 219/121.11 |
| 2010/0199736 A1* | 8/2010 | Fujita ...................... B24C 5/005 72/53 |
| 2011/0232348 A1* | 9/2011 | Hatou ...................... C21D 1/54 72/16.1 |
| 2013/0174627 A1* | 7/2013 | Aoki ........................ C21D 9/08 72/56 |
| 2015/0231762 A1 | 8/2015 | Fujii et al. |
| 2016/0358680 A1 | 12/2016 | Poling et al. |
| 2016/0358681 A1 | 12/2016 | Poling et al. |

* cited by examiner

METHOD OF PEENING AN OBSTRUCTED REGION OF A METAL ASSEMBLY

The present disclosure relates generally to peening of metal assemblies and more specifically to methods of peening nuclear reactor pressure vessel welds.

BACKGROUND

Peening is a process of introducing mechanical stress into the surface layer of a part to compress and strengthen it against future fractures and wear. Peening can be performed in a variety of manners, including shot peening, laser peening and cavitation peening. Cavitation peening involves the application of bubbles onto the surface with the part in a liquid environment. The collapsing of the bubbles imparts impactive forces to the part. When an existing peening apparatus is insufficient to service a specifically shaped part of a metal assembly, a new peening apparatus is often constructed for that specifically shaped part. Peening is performed on a number of metal assemblies, including assemblies in nuclear power plants.

A nuclear power plant has a nuclear reactor housed within a pressure vessel and a reactor coolant system (RCS) for removing heat from the reactor and to generate power. Nozzles are attached to the vessels and/or piping for a number of purposes, such as for connecting piping and instrumentation, such as for example Core Exit Thermocouples (CETs), providing vents, and securing control element drive mechanisms and heater elements.

The nuclear industry is required to perform inspections of such nozzles, as well as their welds, due to the emergence of primary water stress corrosion cracking (PWSCC). Stress corrosion cracking occurs in a material due to a combination of a corrosive environment and tensile forces placed on the material. Cracking can be induced in materials in different ways including cold forming, welding, grinding, machining, and heat treatment as well as other physical stresses placed on the material. Stress corrosion cracking in nuclear reactor environments is a significant phenomenon that must be carefully monitored for successful operation of a nuclear power plant facility. Without careful monitoring for PWSCC, material defects may begin and may ultimately damage the material. If cracking continues, the materials may be damaged to such an extent that the materials must be removed from service and replaced. In the nuclear reactor environment, such replacement of components is extremely undesirable due to radiological concerns related to worker and facility safety, as well as overall plant economic concerns.

WO 2016/085745, WO 2016/085747, EP 0622156 A1 and JP 4831807 disclose methods of peening parts of a closure head of the nuclear reactor pressure vessel.

SUMMARY OF THE INVENTION

In metal assemblies, peening an obstructed region can be difficult or impossible with an existing peening apparatus and constructing a new peening apparatus, including a specific peening nozzle, can be cost prohibitive and sometimes impossible. More specifically, peening certain surface areas of a nuclear reactor pressure vessel susceptible to PWSCC can be difficult due to parts blocking access to surface area to be peened. In particular, CET nozzle funnels block access to areas susceptible to PWSCC. Additionally, the close proximity of the CET funnel to the Reactor Vessel Closure Head (RVCH) can prevent inspection and repair activities on a low hill side of a J-groove weld. For CET nozzles, the CET funnel itself blocks access to some of the susceptible nozzle material. Inspection or remediation from the outside diameter of the nozzle requires removal and re-installation of the funnel which is costly and radiation intensive. Being able to remove only the blocking areas of the funnel is faster and lower dose than a full removal and replacement.

A method for peening an obstructed region of a metal assembly that is obstructed by an obstructing part of the metal assembly is provided. The method includes determining an optimal peening path for treating the obstructed region irrespective of the obstructing part; identifying a portion of the obstructing part within the optimal peening path; determining a section of the portion of the obstructing part that is removable without affecting a mechanical integrity and functionality of the obstructing part; removing, by machining, the section so as to create additional space along the optimal peening path; and peening the obstructed region, a path of the peening at least partially crossing through the additional space.

A method for peening a nuclear reactor pressure vessel is also provided. The nuclear reactor pressure vessel includes a part penetrating a sloped wall of the nuclear reactor pressure vessel. A low hill side of the part defines an acute angle with the sloped wall and a high hill side of the part defines an obtuse angle with the sloped wall. The method includes removing, by machining, material of a radially enlarged section of the part at the low hill side of the part. The radially enlarged section forms a free end of the part. The machining creates additional space, which was occupied by the removed material before the machining, between the sloped wall and the part. The method also includes peening the nuclear reactor pressure vessel with a path of the peening at least partially crossing through the additional space.

BRIEF DESCRIPTION OF THE DRAWINGS

The present invention is described below by reference to the following drawings, in which:

FIG. 3d shows an enlarged cross-sectional view of the view shown in FIG. 3a.

DETAILED DESCRIPTION

Figure 1:
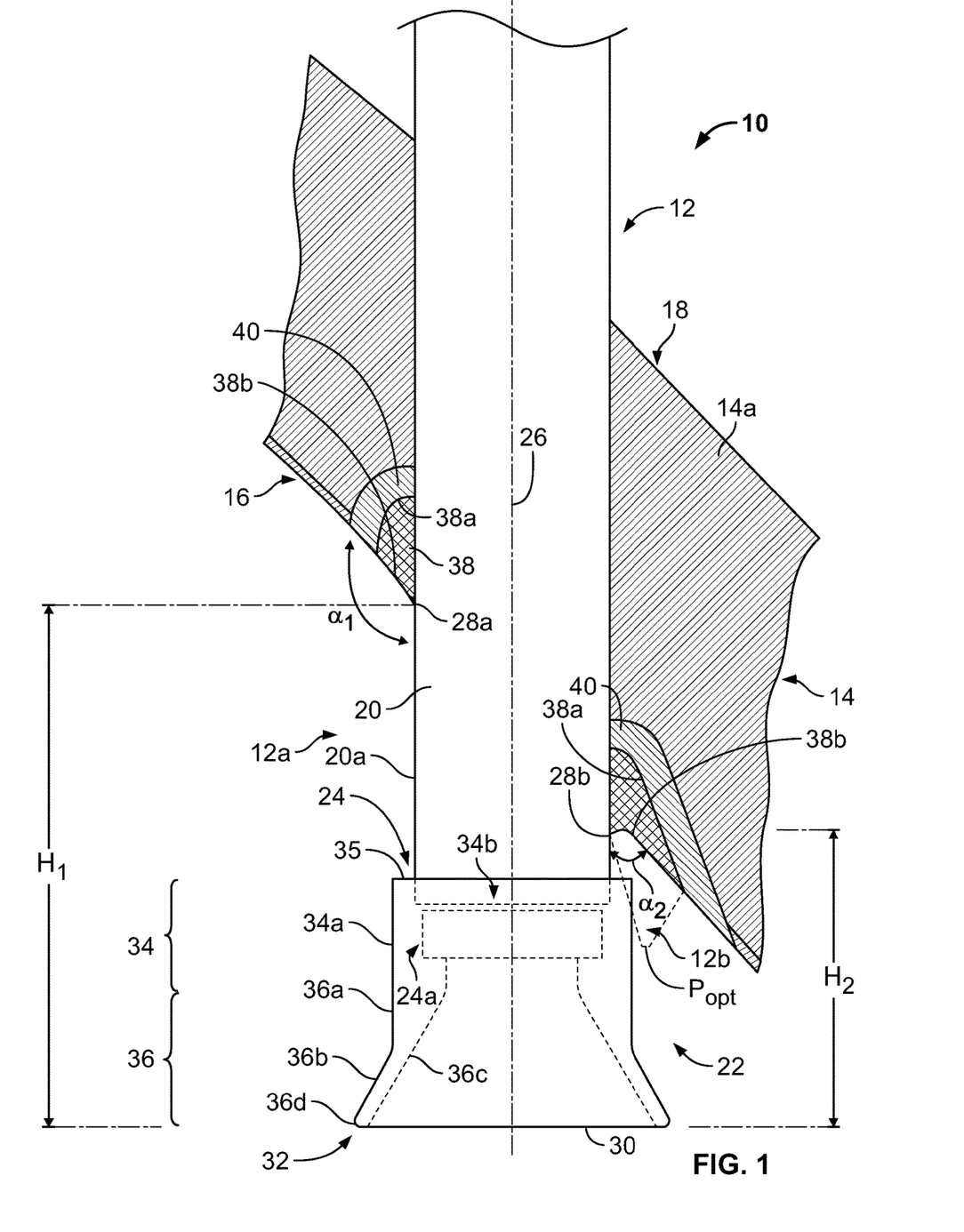
FIG. 1 shows cross-sectional side view of a portion of a closure head of a nuclear reactor pressure vessel including a CET nozzle penetrating a sloped wall.

FIG. 1 shows a cross-sectional side view of a portion of a metal assembly in the form of a closure head 10 of a nuclear reactor pressure vessel including a part, in the form of a CET nozzle 12, protruding from a sloped wall 14 of closure head 10. During operation of the nuclear reactor, the closure head is fixed on top of a cylindrical shell. During refueling operations, closure head 10 is removed from a cylindrical shell, at which time maintenance operations may be performed on closure head 10. As is known, closure head 10 is hemispherical in shape and include an inner hemispherical surface 16, which faces an interior of the pressure vessel when closure head 10 is attached to the cylindrical shell, and an outer hemispherical surface 18, which faces away from of the pressure vessel when closure head 10 is attached to the cylindrical shell. Nozzle 12 extends through closure head 10 from outer surface 18 to inner surface 16 by penetrating through sloped wall 14. More specifically, nozzle 12 includes a tubular section 20 passing through sloped wall 14 and guide funnel 22 fixed to a bottom end 24 of tubular section 20 inside closure head 10. In one preferred embodiment, tubular section 20 is formed of Alloy 600 and guide funnel 22 is 304 stainless steel.

Nozzle 12 is positioned such that a center longitudinally extending axis 26 of nozzle 12 extends vertically and a high hill side 12a of nozzle 12 at a highest vertical point 28a forms an obtuse angle $\alpha 1$ with respect to of sloped wall 14 and a low hill side 12b of nozzle 12 at a lowest vertical point 28b forms an acute angle $\alpha 2$ with respect to sloped wall 14. The terms axially, radially and circumferentially as used herein are used with respect to center axis 26. As used herein, the high hill side 12a of nozzle 12 is defined as the half of nozzle 12 centered on the highest vertical point 28a of nozzle 12 joining sloped wall 14 and the lower hill side 12b of nozzle 12 is defined as the half of nozzle 12 centered on the lowest vertical point 28b of nozzle 12 joining sloped wall 14. Referring to the view in FIG. 1, high hill side 12a is to the left of center axis 26 and low hill side 12b is the right of center axis 26. Nozzle 12 protrudes from inner surface 16 a maximum height H1 from point 28a to a bottom edge 30 of nozzle 12, which is formed by the bottom edge of funnel 22, and protrudes from inner surface 16 a minimum height H2 from point 28b to bottom edge 30.

Guide funnel 22 is radially enlarged with respect to tubular section 20 and thus forms a radially enlarged section of nozzle 12 at a bottom free end 32 of nozzle 12. Guide funnel 22 includes an upper section 34 fixed to bottom end 24 of tubular section 20 and a lower section 36 extends downward from upper section 34 to lower edge 30. Upper section 34 includes a radially extending annular top edge 35 extending perpendicular to a cylindrical outer diameter surface 20a of tubular section 20. Extending axially downward from top edge 35, upper section 34 includes a cylindrical outer diameter surface 34a. On an interior thereof, upper section 34 also includes a stepped inner diameter surface 34b connected to a stepped outer diameter surface 24a of lower end 24 of tubular section 20. Lower section 36 includes a cylindrical outer diameter surface 36a coincident with cylindrical outer diameter surface 34a and a frustoconical outer surface 36b extending downward and radially outward from cylindrical outer diameter surface 36a to define an outermost outer diameter 36d of guide funnel 22. Lower section 36 further includes a frustoconical inner surface 36c extending downward and radially outward from a bottom of stepped inner diameter surface 34b to bottom edge 30.

Nozzle 12 is fixed to wall 14 by an annular weld 38 joining cylindrical outer diameter surface 20a of tubular section 20 and inner surface 16 of wall 14 together. In this embodiment, weld 38 is considered a J-groove weld, because when viewed cross-sectionally as in FIG. 1, weld 38 has a J-shaped perimeter 38a. A heat affected zone 40 of wall 14, which surrounds perimeter 38a, also has a J-shape and joins weld 38 with a remaining material 14a of wall 16, i.e., a portion of wall 14 unaffected by the welding. Weld 38 includes an interior facing surface 38b that forms a portion of inner surface 16 of wall 14 that is contiguous with cylindrical outer diameter surface 20a.

Figure 2:
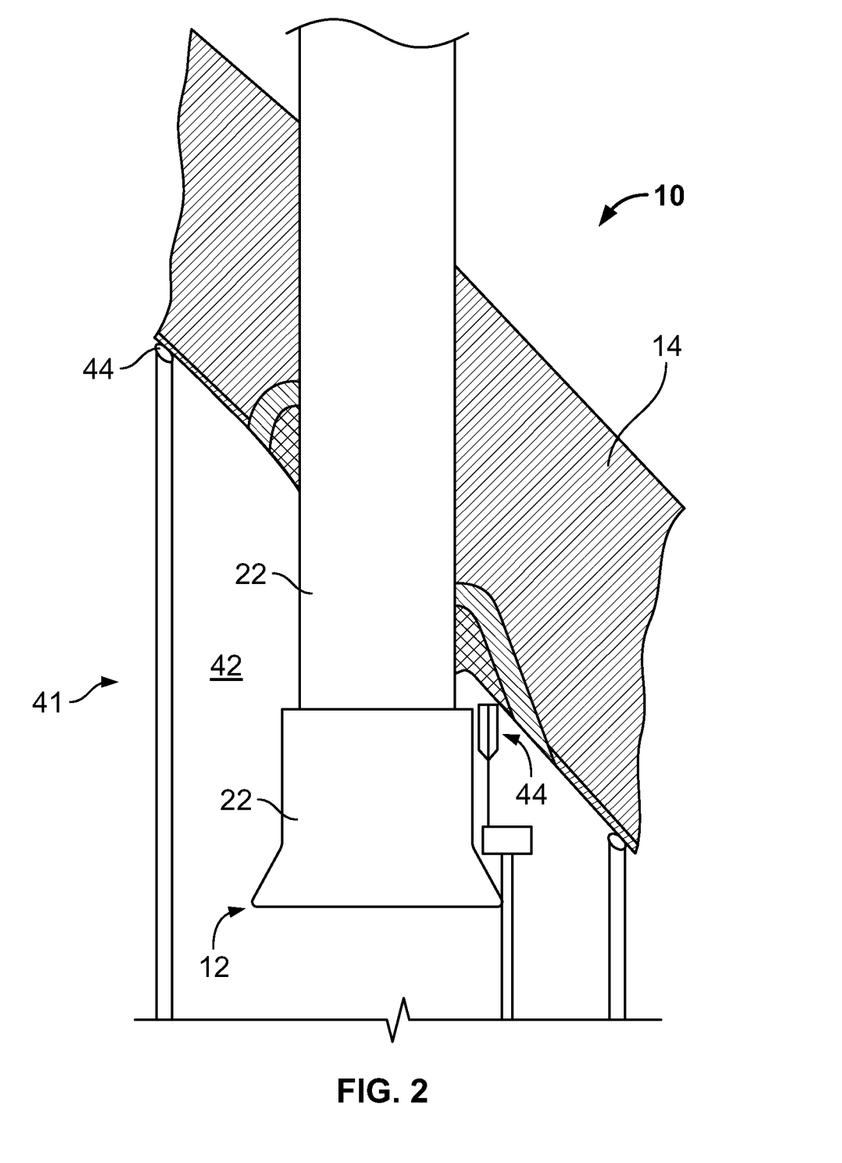
FIG. 2 shows a cross-sectional side view of machining a guide funnel of the CET nozzle in accordance with an embodiment of the invention.

Due to the radial enlargement of guide funnel 22 with respect to tubular section 20, and the close proximity of top edge 35 to weld 38 at low hill side 12b, peening an entirety of surface 38b of weld 38 is very difficult, if not impossible, as low hill side 12b is an obstructed region that is obstructed by an obstructing part, in the form of guide funnel 22. By inspecting the area of wall 14 around nozzle 12, by for example a visual inspection, to determine the obstructed region of wall 14 that needs to be peened and by considering the peening path of an existing peening nozzle, for example the peening nozzle of WO 2016/085747, and an optimal peening path $P_{opt}$ for treating the obstructed region irrespective of the obstructing part is determined. In other words, the optimal peening path is that which the existing peening apparatus would take if the wall 14 was completely unobstructed. After the optimal peening path is determined, a portion of the obstructing part that is in the path is identified. In this example, upper section 24 of guide funnel 22 is identified as being with the optimal peening path $P_{opt}$. Next, a section of the portion of the obstructing part that is removable without affecting a mechanical integrity and functionality of the obstructing part is determined. This can be determined by structural analysis of the connection between guide funnel 22 and tubular section Next, a section of the portion of the obstructing part that is removable without affecting a mechanical integrity and functionality of the obstructing part is removed by machining. More specifically, at least a portion of low hill side 12b of guide funnel 22 is removed to allow for peening of surface 38b of weld 38. In a preferred embodiment, the portion of low hill side 12b is removed by machining guide funnel 22, specifically electrical discharge machining (EDM). FIG. 2 shows an embodiment of the EDM of guide funnel 22. A container 41 filled with liquid 42 and sealingly contacting inner surface 16 via seals 44 is provided around guide funnel 22 and an EDM head 44 is provided within the liquid 42 to remove material from guide funnel 22.

Figure 3A:
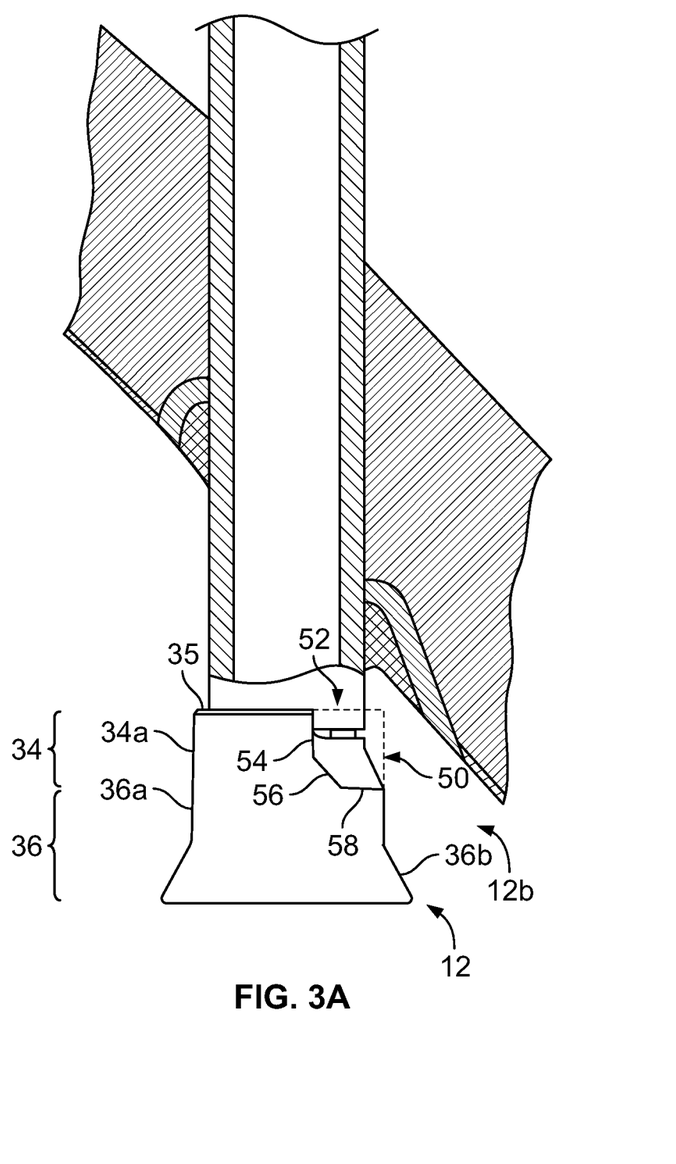
FIG. 3a shows a cross-sectional side view of the CET nozzle after the machining of the CET nozzle.
Figure 3B:
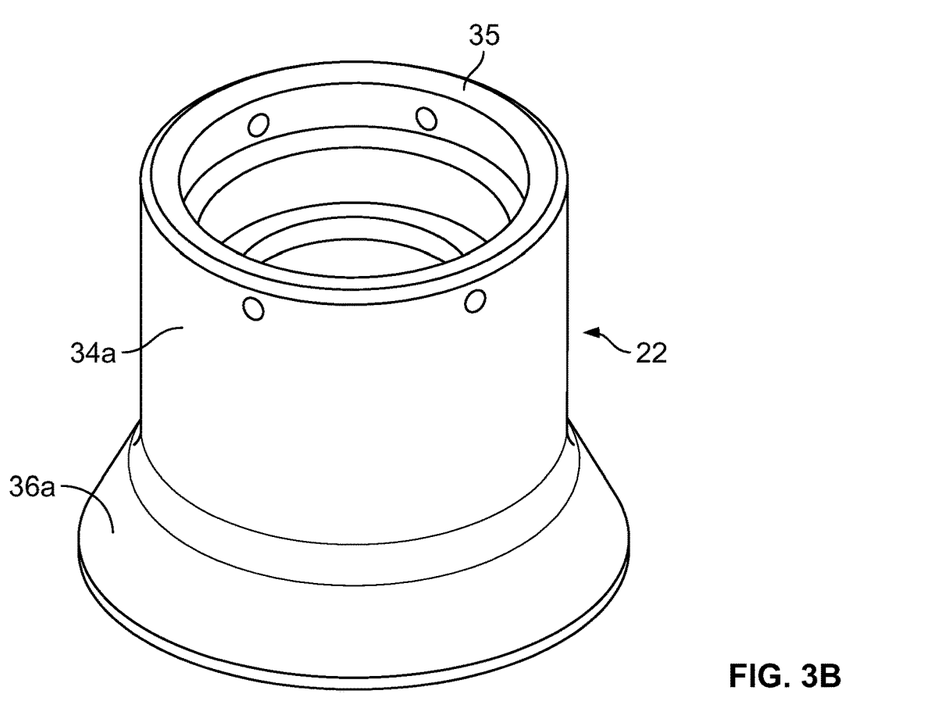
FIGS. 3b and 3c shows perspective views of the CET nozzle before and after machining, respectively.
Figure 3C:
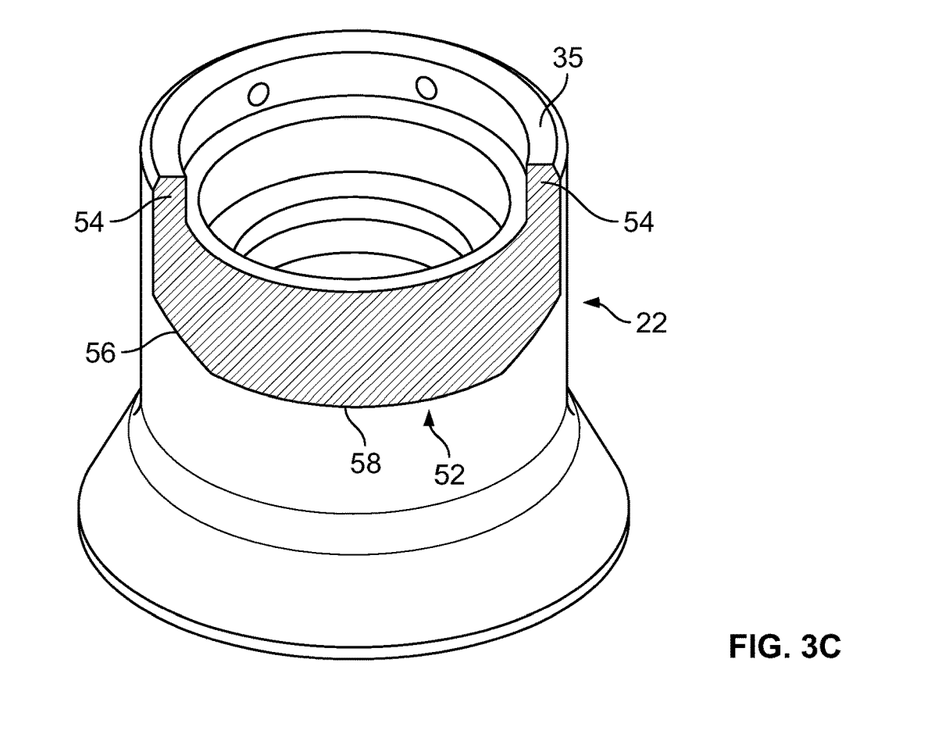
Figure 3D:
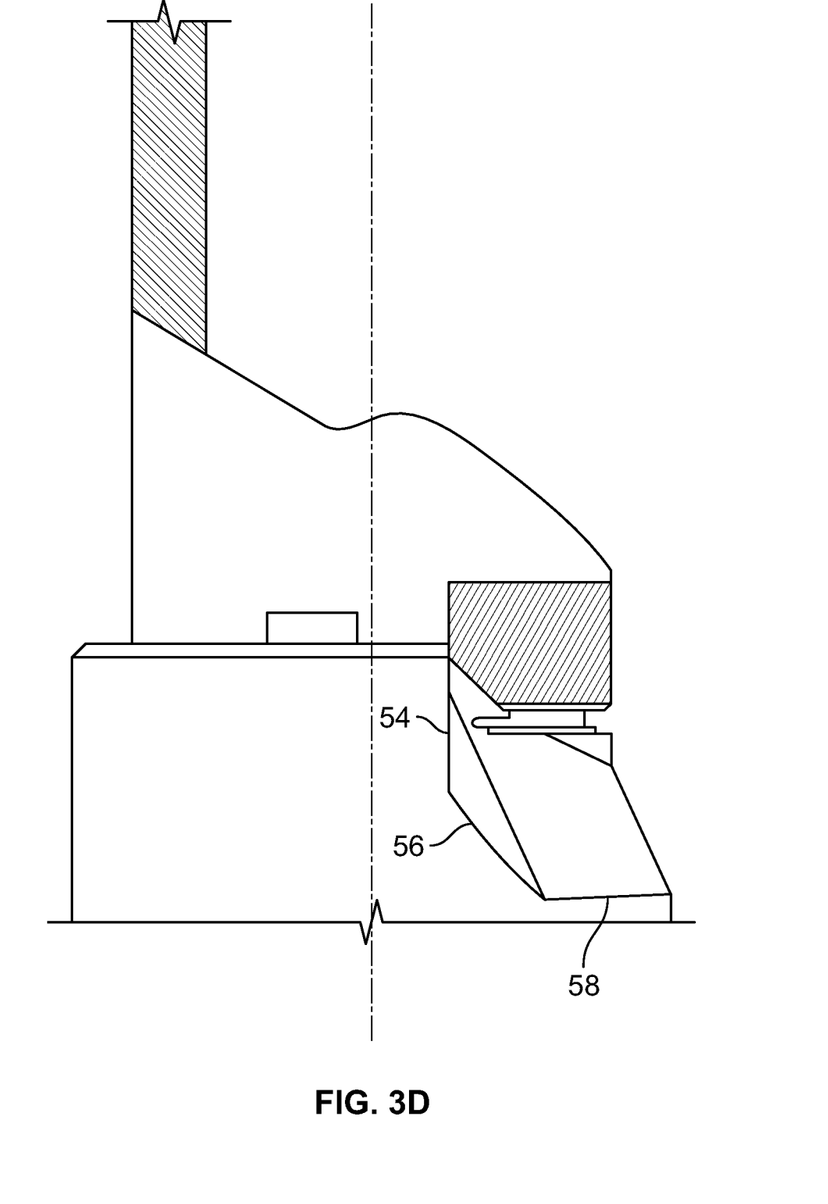

FIG. 3a shows a side view of an embodiment of guide funnel 22 after a portion of low hill side 12b of guide funnel 22 has been removed and FIG. 3c shows a perspective view of guide funnel 22 after machining, while FIG. 3b shows a perspective view of guide funnel 22 before machining. FIG. 3d shows an enlarged view of the view shown in FIG. 3a. The machining creates additional space 50 (as delimited by dashed lines in FIG. 3a), which was occupied by the removed material before the machining, between sloped wall 14 and nozzle 12. More specifically, a portion of upper section 34, including a portion of top edge 35 and a portion of cylindrical outer diameter surface 34a, has been removed by EDM at the low hill side 12b to create a notch 52 in top edge 35 of guide funnel 22 delimiting the additional space 50. Notch 52 extends axially downward from top edge 35 and extends circumferentially between radially and axially extending walls 54 delimiting the circumferential extent of the additional space 50 for peening surface 38b of weld 38. As shown in FIG. 3c, notch 52 extends at a circumferential angle in a range of 60 degrees to 180 degrees between walls 54.

In the embodiment shown in FIG. 3a, wall 54 extends axially away from top edge 35 to a beveled wall 56 of notch 52, with beveled wall 56 extending axially downward to a lowermost circumferentially extending edge 58 of notch 52 that joins cylindrical outer diameter surface 34a or 36a. Beveling of nozzle 52 during the machining provides sufficient additional space 50 for peening, while minimizing the amount of material that is removed from nozzle 22 by machining. In the embodiment shown in FIGS. 3a, 3b, the machining uncovers a portion of lower end 24 of tubular section 20 that was previously covered by guide funnel 22 before the machining.

Figure 4:
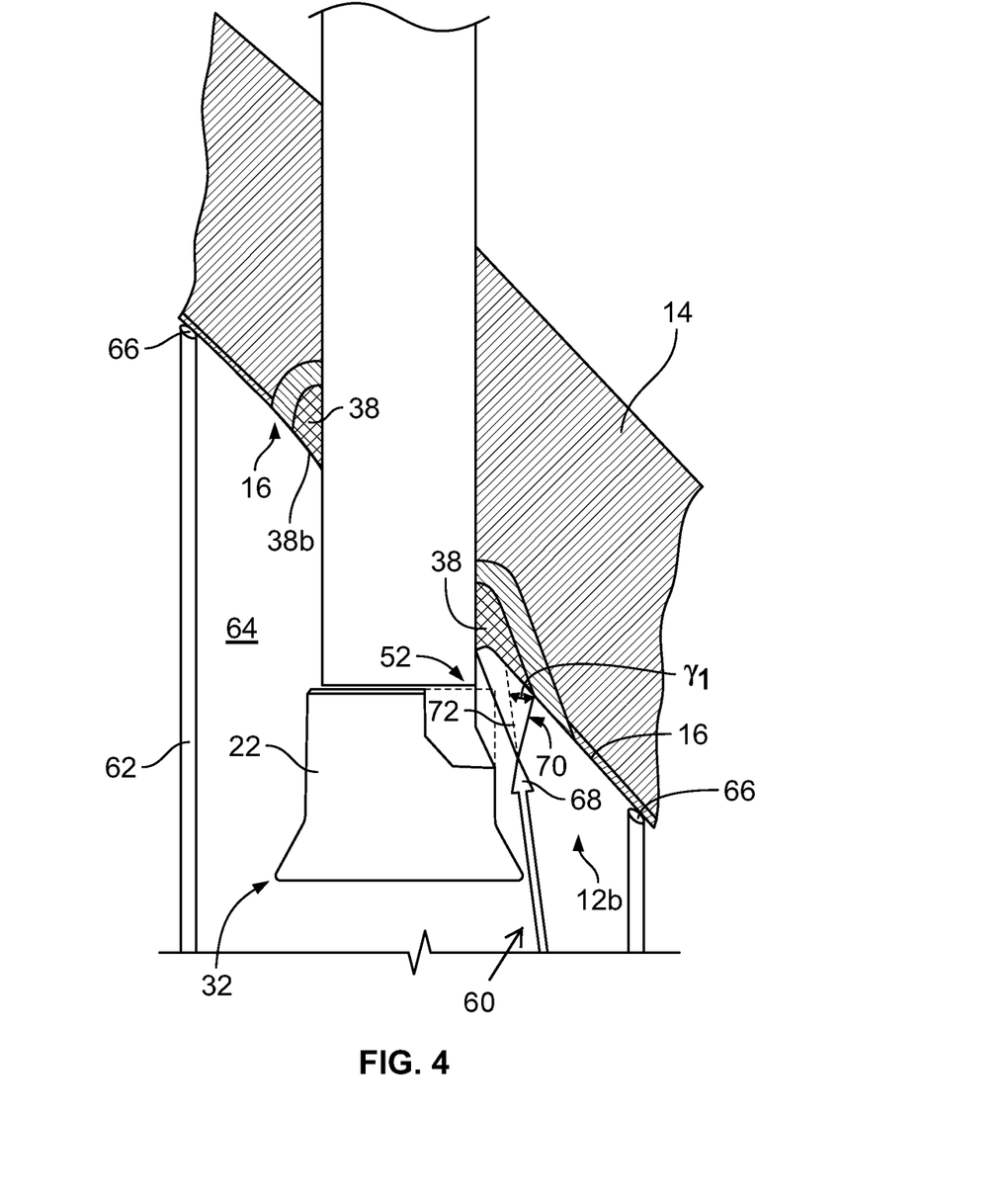
FIG. 4 shows a cross-sectional side view of peening of a weld fixing the CET nozzle in the sloped wall after the machining of the CET nozzle.

Following the machining of guide funnel 22, a portion of inner surface 16 of closure head 10 previously blocked by guide funnel 22 at the lower hill side 12b can now be peened to prevent or minimize PWSCC. As shown in FIG. 4, a cavitation peening apparatus 60 is provided for peening an entirety of weld surface 38b. Cavitation peening apparatus 60 includes a container 62 filled with liquid 64, which is pressurized at a predetermined pressure, and sealingly contacting inner surface 16 via seals 66, which are provided at an open end of container 62 radially outside of weld 38. Container 62 is provided to surround weld 38 and free bottom end 32 of nozzle 12 such that inner surface 38b of weld 38 is submerged in the liquid 64.

A peening nozzle 68 is positioned within the container 62. In this embodiment, the peening nozzle is a cavitation peening nozzle, but in other embodiments the nozzle can be another type of peening nozzle, such as a laser peening nozzle or a shot peening nozzle. In this embodiment, pressurized liquid, such as water, is ejected from peening nozzle 68, causing cavitation bubbles to form. A nozzle flow 70 is directed at weld surface 38b, causing the cavitation bubbles to settle thereon. Nozzle flow 70 has center axis 72 that forms an angle γ1 of between 10 and 60 degrees with inner surface 16 of sloped wall 14 on low hill side 12b. Nozzle flow 70 at least partial crosses through additional space 52 created by machining of guide funnel 22. The collapsing impact of the cavitation bubbles imparts compressive stress in the materials of the weld surface 38b. Peening nozzle 68 is moved around within container 62 to treat the entirety of surface 38b of weld 38. Thus, cavitation peening is performed on weld 38 without closure head 10 being completely submerged in liquid.

In one preferred embodiment, peening nozzle 68 is part of a customized ultra-high pressure (UHP) cavitation peening tool. The UHP cavitation peening process includes directing peening nozzle 68 at surface 38b and water at high pressure and high velocity is discharged through a small orifice in nozzle 68. Vapor bubbles are formed in the resulting high velocity water jet stream as it contacts the water at comparatively lower pressure. The pressure within each bubble is below the vapor pressure of the surrounding water medium. The bubbles collapse at the surface, generating high pressure shock waves on the work surface that impart compressive stresses to the surface. Typically, the process requires a back pressure to prevent the bubbles from prematurely collapsing. The UHP cavitation peening process initiates and the peening nozzle 68 is driven to rotate by tooling around the axis of the CRDH nozzle 1 so that the entire surface 38b of weld 38 can be peened. As the peening nozzle 68 rotates, the peening nozzle 68 may also be actuated vertically up and down as needed for the optimal process effectiveness.

In this embodiment, due to the minimal amount of material removed from guide funnel 22, further repair of guide funnel 22 is not necessary. Guide funnel 22 has threads and is screwed on to the tubular section 20. Additionally, there are plug welds and tack welds on the other side of guide funnel 22 that keep guide funnel 22 fixed to tubular section 20. An analysis is then performed to confirm that nozzle 12 is in an acceptable connection to operate with the material removed.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for peening an obstructed region of a metal assembly that is partially obstructed by an obstructing part of the metal assembly comprising:
   determining an optimal peening path for treating the obstructed region irrespective of the obstructing part, said obstructing part being interposed between the optimal peening path and the obstructed region, the optimal peening path being only partially obstructed by said obstructing part;
   identifying a portion of the obstructing part within the optimal peening path, the portion of the obstructing part being arranged at a distance from the obstructed region such that a free space is delimited between the obstructed region and the obstructing part, the optimal peening path passing through the free space;
   determining a section of the portion of the obstructing part that is removable without affecting a mechanical integrity and functionality of the obstructing part;
   removing, by machining, the section so as to create additional space along the optimal peening path; and
   peening the obstructed region, a path of the peening at least partially crossing through the additional space and through the free space.

2. The method as recited in claim 1 wherein the metal assembly is nuclear reactor pressure vessel.

3. The method as recited in claim 2 wherein the obstructing part penetrates a sloped wall of the nuclear reactor pressure vessel, a low hill side of the obstructing part defining an acute angle with the sloped wall, a high hill side of the obstructing part defining an obtuse angle with the sloped wall, the obstructed region being on a sloped wall on the low hill side of the obstructing part.

4. The method as recited in claim 3 wherein the obstructing part includes a radially enlarged section, the section being at the low hill side of the obstructing part, the radially enlarged section forming a free end of the obstructing part.

5. The method as recited in claim 3 the obstructing part is held in the sloped wall by a weld, the peening including peening the weld.

6. The method as recited in claim 5 wherein the peening of the weld including peening a surface of the weld at an angle of 10 to 60 degrees.

7. The method as recited in claim 5 wherein the weld is a J-weld.

8. The method as recited in claim 4 wherein the obstructing part includes a tubular section passing through the sloped wall, the radially enlarged section being a guide funnel fixed to a lower end of the tubular section.

9. The method as recited in claim 3 wherein the sloped wall is hemispherical.

10. The method as recited in claim 9 wherein the sloped wall is part of a closure head of the nuclear reactor pressure vessel.

11. The method as recited in claim 10 wherein the obstructing part is a core exit thermocouple nozzle.

12. The method as recited in claim 8 wherein the machining forms a notch in a top edge of the guide funnel delimiting the additional space, the path of the peening at least partially crossing through the notch.

13. The method as recited in claim 12 wherein the notch extends at a circumferential angle in a range of 60 degrees to 180 degrees.

14. The method as recited in claim 8 wherein the guide funnel covers the lower end of the tubular section before the machining, the machining uncovering a section of the lower end.

15. The method as recited in claim 1 wherein the machining is electrical discharge machining.

16. The method as recited in claim 1 wherein the peening is cavitation peening or laser peening.

17. The method as recited in claim 4 wherein the peening is cavitation peening, and wherein the radially enlarged section of the obstructing part is surrounded by a container of liquid during the cavitation peening.

18. A method for peening an obstructed region of a metal assembly that is obstructed by an obstructing part of the metal assembly, the metal assembly being a nuclear reactor pressure vessel, comprising:
    determining an optimal peening path for treating the obstructed region irrespective of the obstructing part;
    identifying a portion of the obstructing part within the optimal peening path;
    determining a section of the portion of the obstructing part that is removable without affecting a mechanical integrity and functionality of the obstructing part;
    removing, by machining, the section so as to create additional space along the optimal peening path; and
    peening the obstructed region, a path of the peening at least partially crossing through the additional space;
    wherein the obstructing part penetrates a sloped wall of the nuclear reactor pressure vessel, a low hill side of the obstructing part defining an acute angle with the sloped wall, a high hill side of the obstructing part defining an obtuse angle with the sloped wall, the obstructed region being on a sloped wall on the low hill side of the obstructing part;
    wherein the sloped wall is hemispherical and is part of a closure head of the nuclear reactor pressure vessel;
    wherein the obstructing part is a core exit thermocouple nozzle.

19. A method for peening an obstructed region of a metal assembly that is obstructed by an obstructing part of the metal assembly, the metal assembly being a nuclear reactor pressure vessel, comprising:
    determining an optimal peening path for treating the obstructed region irrespective of the obstructing part;
    identifying a portion of the obstructing part within the optimal peening path;
    determining a section of the portion of the obstructing part that is removable without affecting a mechanical integrity and functionality of the obstructing part;
    removing, by machining, the section so as to create additional space along the optimal peening path; and
    peening the obstructed region, a path of the peening at least partially crossing through the additional space;
    wherein the obstructing part penetrates a sloped wall of the nuclear reactor pressure vessel, a low hill side of the obstructing part defining an acute angle with the sloped wall, a high hill side of the obstructing part defining an obtuse angle with the sloped wall, the obstructed region being on a sloped wall on the low hill side of the obstructing part;
    wherein the obstructing part includes a radially enlarged section, the section being the low hill side of the obstructing part, the radially enlarged section forming a free end of the obstructing part;
    wherein the obstructing part includes a tubular section passing through the sloped wall, the radially enlarged section being a guide funnel fixed to a lower end of the tubular section;
    wherein the machining forms a notch in a top edge of the guide funnel delimiting the additional space, the path of the peening at least partially crossing through the notch, and/or the guide funnel covers the lower end of the tubular section before the machining, the machining uncovering a section of the lower end.

* * * * *